April 9, 1940.   F. COETERIER ET AL   2,196,854
OPTICAL IMAGE REPRODUCER
Filed Dec. 24, 1936
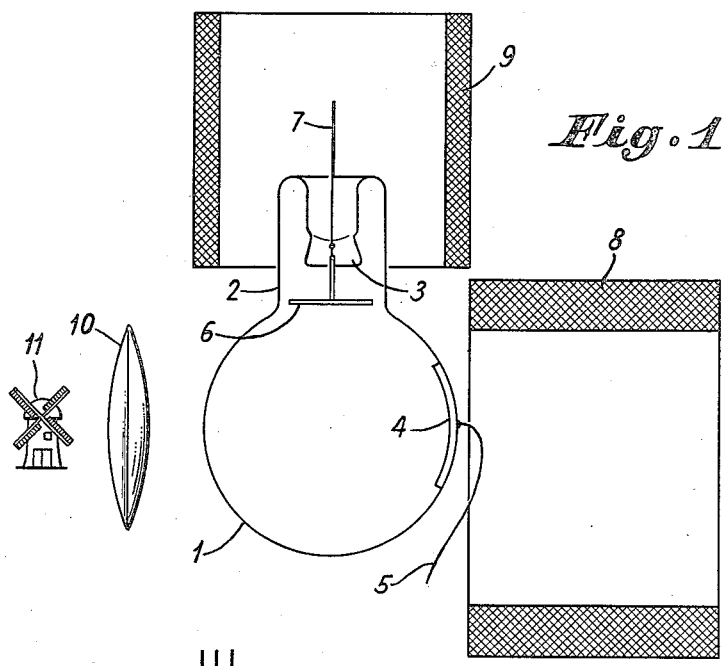
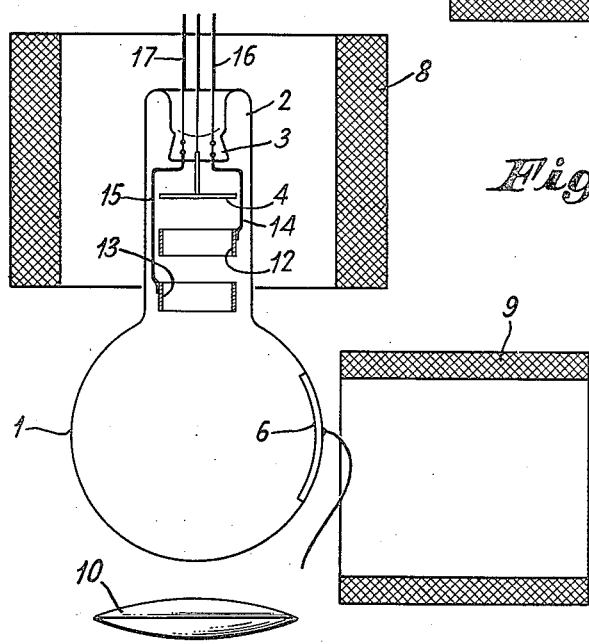
INVENTORS
FREDERIK COETERIER
MARTEN C. TEVES
BY
ATTORNEY Patented Apr. 9, 1940

2,196,854

UNITED STATES PATENT OFFICE 2,196,854

OPTICAL IMAGE REPRODUCER

Frederik Coeterier and Marten Cornelis Teves, Eindhoven, Netherlands, assignors, by mesne assignments, to Radio Corporation of America, New York, N. Y., a corporation of Delaware Application December 24, 1936, Serial No. 117,440
In Germany January 3, 1936

1 Claim. (Cl. 250—153)

This invention relates to optical image intensifiers and reproducers and more particularly to a type of reproducer wherein the photoelectric surface for producing an electron image characteristic of the optical image faces the optical image directly, and viewing of the reproduced image takes place from the side of the luminescing reproducing screen on which the electron image impinges.

Electric devices are already known in which a picture set up by electrons is projected on a picture surface. This picture may be obtained, for instance, by throwing a picture formed by light rays on a photoelectric cathode of uniform sensitiveness, which picture causes this cathode to emit a beam of electrons the electron distribution of which corresponds to the intensity distribution of the picture formed by light rays projected on the cathode. This picture need not always be formed by visible light rays but may also consist of invisible rays (such as infra-red or ultra-violet rays).

When a photo-electric cathode with locally uneven sensitiveness is uniformly illuminated or when a thermionically emitting incandescent cathode with locally uneven sensitiveness is uniformly heated, a picture set up by electrons is obtained which is a reproduction of the local sensitiveness of the photo-electric electrode or of the incandescent cathode respectively.

In these devices the electrons forming such a picture are thrown upon a projection surface by the action of an electric field, the electrons impinging on this projection surface exhibiting a distribution which may exactly correspond to the electron distribution emanating from the emitting surface, i. e. the electron distribution setting up the projected picture, if desired, the image on the projection surface may be enlarged or reduced or also be distorted with respect to the initial picture formed by electrons. The projection surface generally consists of the anode itself, but it is also possible to form the image not on the anode, but on a projection surface separated therefrom. The picture formed by electrons may be transformed again into a luminous image, for instance with the aid of fluorescent material provided on the projection surface, which image can either be observed with the eye or be recorded photographically. As an alternative the image formed by electrons may be recorded on a photographic plate through direct action of the electrons on said plate.

Hereinafter the initial picture, such as for example the picture emanating from a photo sensitive cathode, is called the "primary picture set up by electrons" briefly stated "primary picture" whereas the electron image formed on the projection surface will be called the "secondary image set up by electrons," briefly "secondary image."

In the known devices the cathode and the projection surface generally consist of flat surfaces extending in parallel with each other and arranged opposite each other (i. e. with coinciding axes). Instead of flat surfaces it has also been proposed to use slightly curved surfaces, but these are always arranged opposite each other, i. e. with coinciding axes.

When a photoelectric cathode and the projection surface are arranged in parallel and opposite each other it is necessary either to shape this cathode so that the picture formed by light rays can be projected on the back of the cathode and the light rays can penetrate to the photoelectric material, or the light rays must be thrown obliquely on the front side of the cathode, in order to form an electron image of the optical view which may be reproduced by the projection surface. When in this case the secondary image is transformed again into a luminous picture with the aid of fluorescent material, this picture can be observed only in an oblique direction or the projection surface must be so shaped that the fluorescence rays are visible on the back of the projection surface. Moreover, the drawback often occurs that the fluorescence rays react on the cathode and bring about emission of electrons which will strike the projection surface so that the secondary image will become distorted and blurred. These defects also occur partly, when the primary picture is not produced photoelectrically, but in another manner such as by thermionic emission.

The invention has for its purpose to avoid these disadvantages and to provide a device for producing an electron image of a primary picture set up by electrons which devices allow more freedom in arranging the projection surface on which the image is formed and the surface from which the primary picture emanates.

According to the invention the projection surface and the surface from which the primary picture emanates are so arranged that their axes are at an angle with each other (i. e. that they do not coincide and do not extend in parallel), the paths of the electrons being curved with the aid of a magnetic field in such a manner that a secondary image, corresponding to the primary picture, is set up on the projection surface. The projection surface and the surface from which the primary picture emanates may be arranged in such a manner that their axes extend normally to one another.

It has been found that by means of a magnetic field an appreciable curvature, can be imparted to the paths of the electrons without the variations, corresponding to the primary picture, in the density of the electrons of the beam of electrons issuing from the surface whereon the primary picture is formed being lost. It is known to alter the paths of electrons travelling through a vacuum space with the aid of a magnetic field. It is remarkable in the device according to the invention that in spite of the curvature of the electron paths, a secondary image is obtained on the picture surface, the electron distribution of this image corresponding to that of the primary picture, although it may sometimes be slightly distorted.

The use of the magnet field allows a greater freedom in positioning the projection surface and the primary picture surface. As has already been stated the axes of these surfaces may extend normally to one another. Hence flat surfaces may be arranged normally to each other. When the primary picture surface consists of a photoelectric cathode, a luminous image can be projected perpendicularly on the front side of this cathode without the projection surface being in the way. When the secondary image on the projection surface normal to the primary picture surface is converted into a fluorescence picture, this fluorescence picture can be observed from a direction normal to the front side of the projection surface and in this case the photoelectric cathode does not constitute a hindrance. The photoelectric cathode need not be made transparent to the light rays falling thereon, while it is not necessary that the projection surface is transparent to fluorescence rays. Thus the construction of the photoelectric cathode and of the projection surface is greatly facilitated and they may be designed so that a high sensitiveness is achieved. In addition the advantage is obtained that the fluorescence rays can practically not react on the photoelectric cathode.

Figs. 1 and 2 of the accompanying drawing schematically represent, by way of example, two devices according to the invention.

The device shown in Fig. 1 comprises an exhausted substantially spherical discharge tube 1 having an attachment 2 and a stem 3 of known construction. Part of the inner side of the spherical wall is coated with a photoelectric cathode 4. The latter consists of a silver layer which is provided on the glass wall and on to which a layer consisting of a mixture of silver particles, caesium oxide particles and caesium particles is applied. The last-mentioned layer has adsorbed to it a thin caesium layer. This cathode is connected to the supply wire 5.

To the stem 3 is secured a flat plate-shaped anode 6 which is coated on the side facing the spherical portion of the tube 1 with a substance such as fluorescent zinc silicate that can be caused to fluoresce by impinging electrons. The anode is connected to the supply wire 7.

Thus the anode 6 and the cathode 4 are arranged so that their axes extend normally to each other.

Behind the photoelectric cathode 4 is provided a magnet coil 8. The axis of this magnet coil is at a greater distance from the anode 6 than is the axis of the photoelectric cathode 4. The portion 2 of the tube is surrounded by another magnet coil 9.

By means of the lens 10 a luminous image of some object 11 can be projected on the photoelectric cathode 4, which is connected to the negative terminal of a source of direct current of, say, 5000 volts, whereas the anode 6 is connected to the positive terminal of this source. The luminous picture projected on the cathode 4 makes this cathode issue a primary picture set up by electrons. By the action of the electric field and of the magnetic field set up by the magnet coils 8 and 9 the electrons travel towards the anode 6 on which these electrons form the secondary image. In this way the fluorescent substance available on the anode is brought to fluorescence, in other words the secondary image formed by electrons is transformed into a fluorescent image, which can be observed from a direction normal to the anode surface.

The following dimensions of one form of construction are stated by way of example:

Diameter of the spherical portion of the tube _____ millimeters__ 100
Diameter and length of the part 2 of the tube_____millimeters__ 45 and 60 respectively
Diameter of the photoelectric cathode_____
_____millimeters___ 70
Diameter of the anode_____do___ 35
Internal and external diameter of the magnet coil 8____mm__110 and 150 respectively
Length of the magnet coil 8_____mm__ 100
Maximum intensity of field of the magnet coil 8_____gauss___ 900
Internal and external diameter of the magnet coil 9_____mm__ 90 and 110 respectively
Length of the magnet coil 9_____mm__ 100
Maximum intensity of field of the magnet coil 9_____gauss___ 200

The discharge tube 1 of the device shown in Fig. 2 differs from the tube shown in Fig. 1 in that the anode 6 is provided on the wall of the tube, while the cathode 4 is located at some distance from the spherical portion of the tube inside the cylindrical portion 2 of the tube, two metal rings 12 and 13 respectively provided between the cathode and the spherical portion of the tube, said rings being secured to the stem 3 through the supporting wires 14 and 15 respectively and being connected to the supply wires 16 and 17 respectively. These rings 12 and 13 are used as auxiliary electrodes to which may be given either a potential lying between that of the cathode and that of the anode or a higher potential. By means of these auxiliary electrodes the electrons can be accelerated before their paths are curved, hence the secondary image will often be less distorted. The anode 6 may be given a potential lower than that of the auxiliary electrodes 12 and 13 so that the electrons travel against the electric field in the last part of their path. In spite thereof the definition of the image is unaffected.

In the device shown in Figure 2 the coils 8 and 9 have changed their place in comparison with Figure 1. In many cases the effect aimed at can also be ensured by means of a single magnet coil or with the aid of one or more permanent magnets.

The secondary image formed by electrons need not always be converted into a fluorescent image with the aid of fluorescent substance. The secondary image may also be formed on an electrode capable of emitting secondary electrons.

When in this case more secondary electrons are emitted than the quantity of electrons impinging on this electrode the electron image is transformed into an intensified image which is also formed by electrons. The latter image can be projected again on another projection surface and can be rendered visible there, if desired. In this projection the said intensified image consequently plays the part of a "primary picture."

What we claim is:

An optical image intensifier and reproducer comprising an envelope, light responsive means within said envelope positioned substantially normal to the optical path of an optical image impinging thereon for converting the optical image into an electron image, a pair of electromagnetic means positioned substantially at right angles to each other for confining the movement of the electron image to a predetermined arcuate path, at least one of said electromagnetic means encircling a portion of the envelope, means for accelerating the electron image subsequent to its traversal along the arcuate section of the path of its travel, a luminescing screen within said envelope positioned substantially at right angles to the light responsive means and adapted to convert the electron image into an optical image, and means for actively decelerating the movement of said image immediately prior to its impingement of the luminescing screen.

FREDERIK COETERIER.
MARTEN CORNELIS TEVES.